United States Patent
Andreas-Schott et al.

(10) Patent No.: US 8,308,938 B2
(45) Date of Patent: Nov. 13, 2012

(54) THREE-WAY DIVERTER ASSEMBLY FOR A FUEL CELL SYSTEM

(75) Inventors: Benno Andreas-Schott, Pittsford, NY (US); Thomas P Migliore, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1155 days.

(21) Appl. No.: 12/141,591

(22) Filed: Jun. 18, 2008

(65) Prior Publication Data

US 2009/0317676 A1    Dec. 24, 2009

(51) Int. Cl.
*B01D 21/30* (2006.01)

(52) U.S. Cl. .......... 210/136; 210/97; 429/455; 429/456; 429/451

(58) Field of Classification Search .................. 210/136
See application file for complete search history.

(56) References Cited

U.S. PATENT DOCUMENTS

| | | | |
|---|---|---|---|
| 3,100,499 A | * | 8/1963 | Bass .................. 137/246.22 |
| 2008/0102335 A1 | | 5/2008 | Skala |

FOREIGN PATENT DOCUMENTS

| | | | |
|---|---|---|---|
| CN | 101127402 A1 | | 2/2008 |
| DE | 3501827 A1 | | 9/1985 |
| JP | 59009376 A | * | 1/1984 |
| JP | 59009376 A1 | | 1/1984 |
| WO | WO2007063221 A1 | | 6/2007 |

* cited by examiner

*Primary Examiner* — Raymond Alejandro
*Assistant Examiner* — Gary Harris
(74) *Attorney, Agent, or Firm* — Fraser Clemens Martin & Miller LLC; J. Douglas Miller

(57) ABSTRACT

A three-way diverter assembly with a movable member is provided. The three-way diverter assembly includes a housing having a first inlet, a second inlet, a first outlet, and a second outlet. The first inlet and the second inlet are adapted to receive a fluid. The movable member, disposed in the housing adjacent the first inlet, is rotatable about an axis from a first positional limit to a second positional limit, and selectively positional therebetween. Fuel cell systems having the three-way diverter assembly for regulating temperature and humidity of a fuel cell stack are also provided.

12 Claims, 4 Drawing Sheets

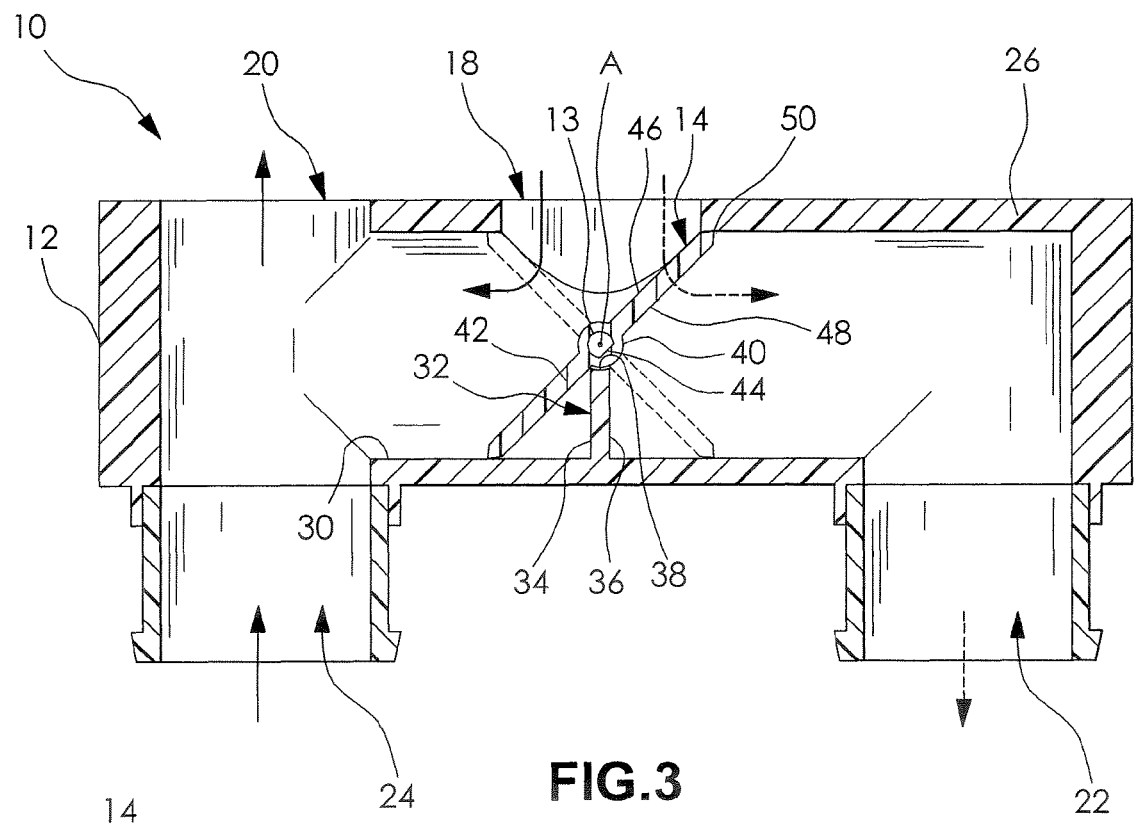
FIG.3
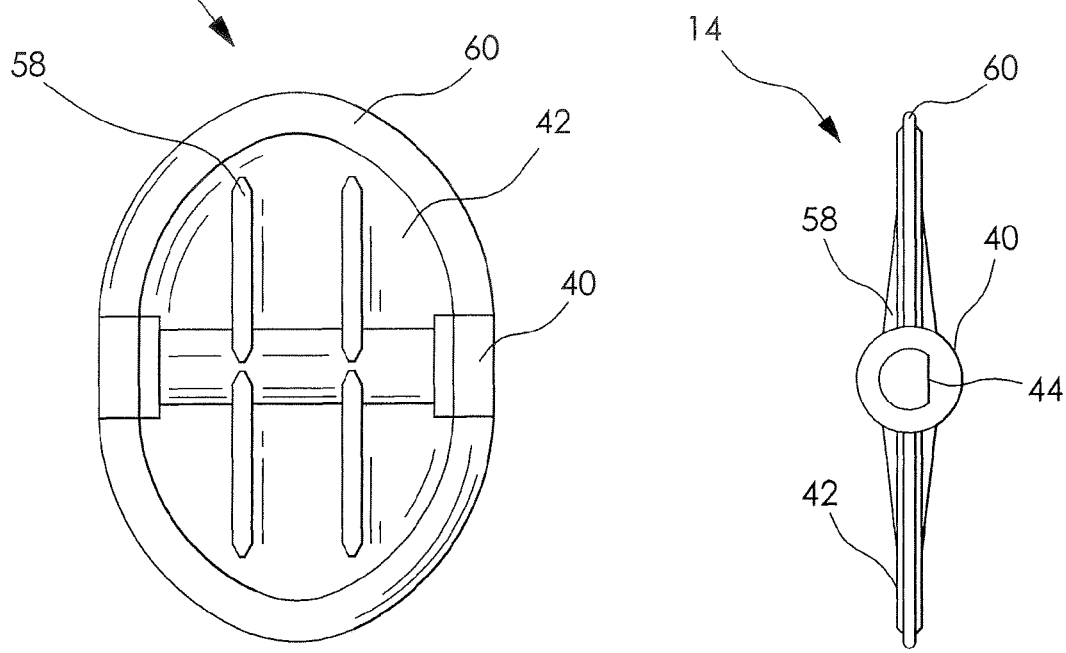
FIG.4     FIG.5

THREE-WAY DIVERTER ASSEMBLY FOR A FUEL CELL SYSTEM

FIELD OF THE INVENTION

The present disclosure relates to a three-way diverter assembly and, more particularly, to a fuel cell system including the three-way diverter assembly.

BACKGROUND OF THE INVENTION

A fuel cell has been proposed as a clean, efficient and environmentally responsible energy source for various applications. Individual fuel cells can be stacked together in series to form a fuel cell stack. The fuel cell stack is capable of supplying a quantity of electricity sufficient to provide power to an electric vehicle. In particular, the fuel cell stack has been identified as a desirable alternative for the traditional internal-combustion engine used in modern vehicles.

One type of fuel cell stack is known as a proton exchange membrane (PEM) fuel cell stack. The typical PEM fuel cell includes three basic components: a cathode, an anode, and an electrolyte membrane. The cathode and anode typically include a finely divided catalyst, such as platinum, supported on carbon particles and mixed with an ionomer. The electrolyte membrane is sandwiched between the cathode and the anode. Porous diffusion media which facilitate a delivery and distribution of reactants, such as hydrogen gas and air, may be disposed adjacent the anode and the cathode.

In a vehicle power system employing the PEM fuel cell stack, the hydrogen gas is supplied to the anodes from a hydrogen storage source, such as a pressurized hydrogen tank. The air is supplied to the cathodes by an air compressor unit. The hydrogen gas reacts electrochemically in the presence of the anode to produce electrons and protons. The electrons are conducted from the anode to the cathode through an electrical circuit disposed therebetween. The protons pass through the electrolyte membrane to the cathode where oxygen from the air reacts electrochemically to produce oxygen anions. The oxygen anions react with the protons to form water as a reaction product.

The electrochemical fuel cell reaction also has a known temperature range within which the reaction may efficiently occur. The electrochemical fuel cell reaction is exothermic and generally allows the fuel cell stack to maintain a temperature within the desired temperature range during an operation thereof. Supplemental heating is typically employed during a start-up operation of the fuel cell stack to raise the temperature of the fuel cell stack within the desired temperature range. For example, the fuel cell stack may be in fluid communication with a coolant system that circulates a coolant through the fuel cell stack. The coolant may be heated, such as with electrical heaters, to raise the temperature of the fuel cell stack. The coolant may also transfer excess heat away from the fuel cell stack by circulating through a radiator that exhausts the heat to the ambient atmosphere.

It is known to regulate the temperature of the fuel cell stack by diverting coolant around the radiator when a heating of the fuel cell stack is desired, and by directing coolant to the radiator when a cooling of the fuel cell stack is desired. Diverter assemblies or valves that selectively modify the coolant flow are employed as thermostats within the fuel cell system. Known diverter valves include rotating disc-type valves, three-way ball valves, three-way plug valves, and three-way butterfly valves. The rotating disc-type valves, three-way ball valves, and three-way plug valves have sliding seals that permit leaking between the valve seated positions, and may also require an undesirable amount of torque to actuate.

Typically, three-way butterfly valves have a substantially flat plate positioned inside the valve body. The flat plate is coupled to a rod that turns the plate to positional limits parallel or perpendicular to the coolant flow. The flat plate is restrictive to the coolant flow when rotated to either end of the valve positional limits. Three-way butterfly valves are also able to be actuated with a more desirable amount of torque than with the other known valves. However, conventional three-way butterfly valves are known to exhibit substantially and non-linear flow control between the valve positional limits, which is undesirable.

Accordingly, it is desirable to produce a diverter assembly that maximizes flow controllability and minimizes a torque actuation requirement. Desirably, the diverter assembly may be employed as a thermostat in a fuel cell system.

SUMMARY OF THE INVENTION

In concordance and agreement with the present invention, a diverter assembly that maximizes flow controllability and minimizes a torque actuation requirement, and that may be employed as a thermostat in a fuel cell system, has surprisingly been discovered.

In one embodiment, the three-way diverter assembly comprises a housing having an inner surface, the housing including a first inlet, a first outlet, and a second outlet, wherein the first inlet is adapted to receive a fluid therethrough; and a movable member disposed in the housing adjacent the first inlet, wherein the movable member is selectively positionable between a first positional limit and a second positional limit, and whereby a backflow of the fluid is minimized by a restrictor as the movable member is rotated between the first positional limit and the second positional limit.

In another embodiment, the fuel cell system comprises a fuel cell stack including a plurality of fuel cells and having a coolant fluid inlet and a coolant fluid outlet; a pump in fluid communication with the fuel cell stack and adapted to provide a coolant fluid thereto; a radiator having a radiator inlet and a radiator outlet, the radiator in fluid communication with the fuel cell stack and the fluid pump; and a three-way diverter assembly disposed between the radiator and the fuel cell stack and adapted to regulate the temperature of the fuel cell stack, the three-way diverter assembly further comprising: a housing having a first inlet in fluid communication with the coolant fluid outlet of the fuel cell stack, a second inlet in fluid communication with the radiator outlet, a first outlet in fluid communication with the coolant fluid inlet of the fuel cell stack, and a second outlet in fluid communication with radiator inlet; and a movable member disposed in the housing adjacent the first inlet, wherein the movable member is selectively positionable between a first positional limit and a second positional limit, and whereby a backflow of the coolant fluid is minimized by a restrictor as the movable member is rotated between the first positional limit and the second positional limit; wherein the three-way diverter assembly selectively causes one of a) the coolant fluid to bypass the radiator and flow to the fuel cell stack, b) the coolant fluid to flow to the radiator, and c) a combination of a) and b), to thermostatically regulate the fuel cell stack.

In another embodiment, the fuel cell system comprises a fuel cell stack including a plurality of fuel cells and having a cathode inlet and a cathode outlet; an air compressor in fluid communication with the fuel cell stack and adapted to provide a flow of charged air thereto; a water vapor transfer device in fluid communication with the air compressor and the fuel cell stack and adapted to selectively humidify the charged air; and a three-way diverter assembly in fluid communication with the air compressor and each of the fuel cell stack and the water vapor transfer device, the three-way diverter assembly adapted to regulate a relative humidity of the fuel cell stack, the three-way diverter assembly further comprising: a housing having a first inlet in fluid communication with the air compressor, a first outlet in fluid communication with the water vapor transfer device, and a second outlet in fluid communication with the cathode inlet of the fuel cell stack, and a movable member disposed in the housing adjacent the first inlet, wherein the movable member is selectively positionable between a first positional limit and a second positional limit, and whereby a backflow of the charged air is minimized by a restrictor as the movable member is rotated between the first positional limit and the second positional limit; wherein the three-way diverter assembly selectively causes one of a) the charged air to bypass the water vapor transfer device and flow to the fuel cell stack, b) the charged air to flow to the water vapor transfer device, and c) a combination of a) and b), to regulate a humidity of the fuel cell stack.

DRAWINGS

The above, as well as other advantages of the present invention, will become readily apparent to those skilled in the art from the following detailed description of various embodiments of the invention when considered in the light of the accompanying drawings in which:

FIG. 3 is a side cross-sectional view of a three-way diverter assembly according to another embodiment of the invention, and showing a first mode and a second mode of operation thereof;

FIG. 4 is a front elevational view of a three-way valve of the three-way diverter assembly according to another embodiment of the invention;

FIG. 5 is a side elevational view of the three-way valve illustrated in FIG. 4;

Figures 6, 7:
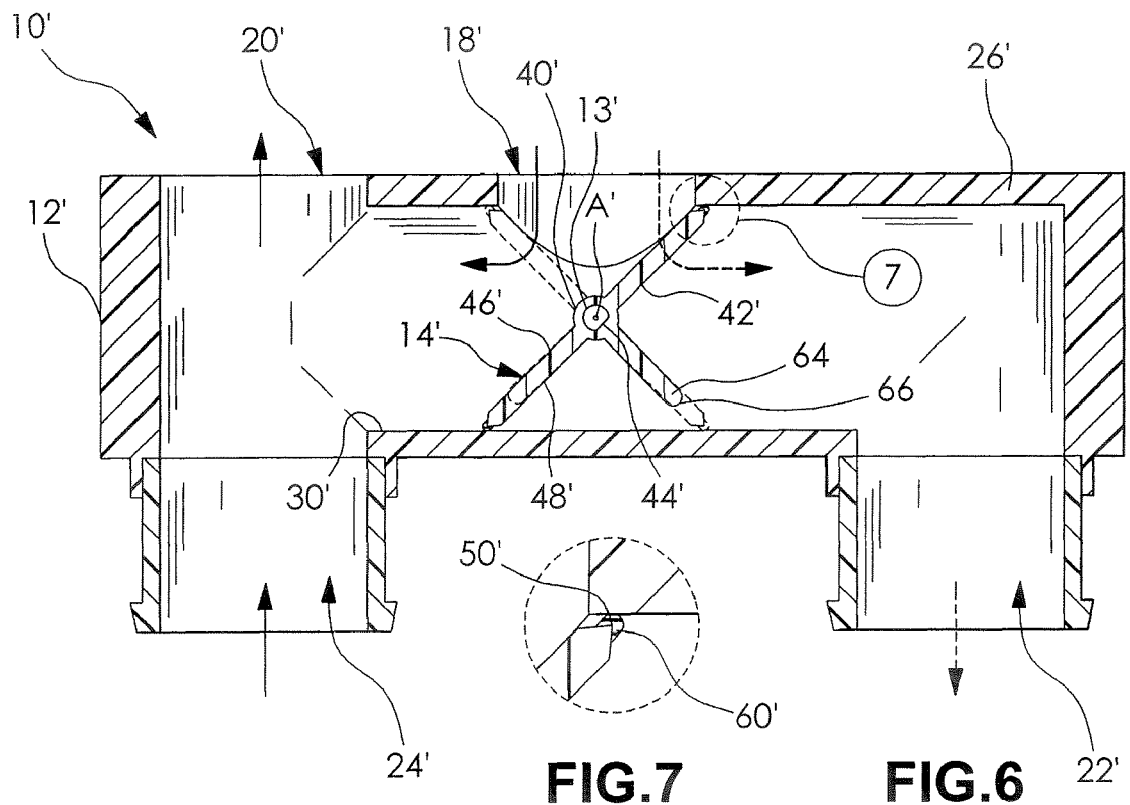
FIG. 6 is a side cross-sectional view of a three-way diverter assembly according to another embodiment of the invention, and showing a first mode and a second mode of operation thereof.
FIG. 7 is an enlarged sectional view of a sealing area of the three-way diverter assembly illustrated in FIG. 6, within circle 7.
Figure 8:
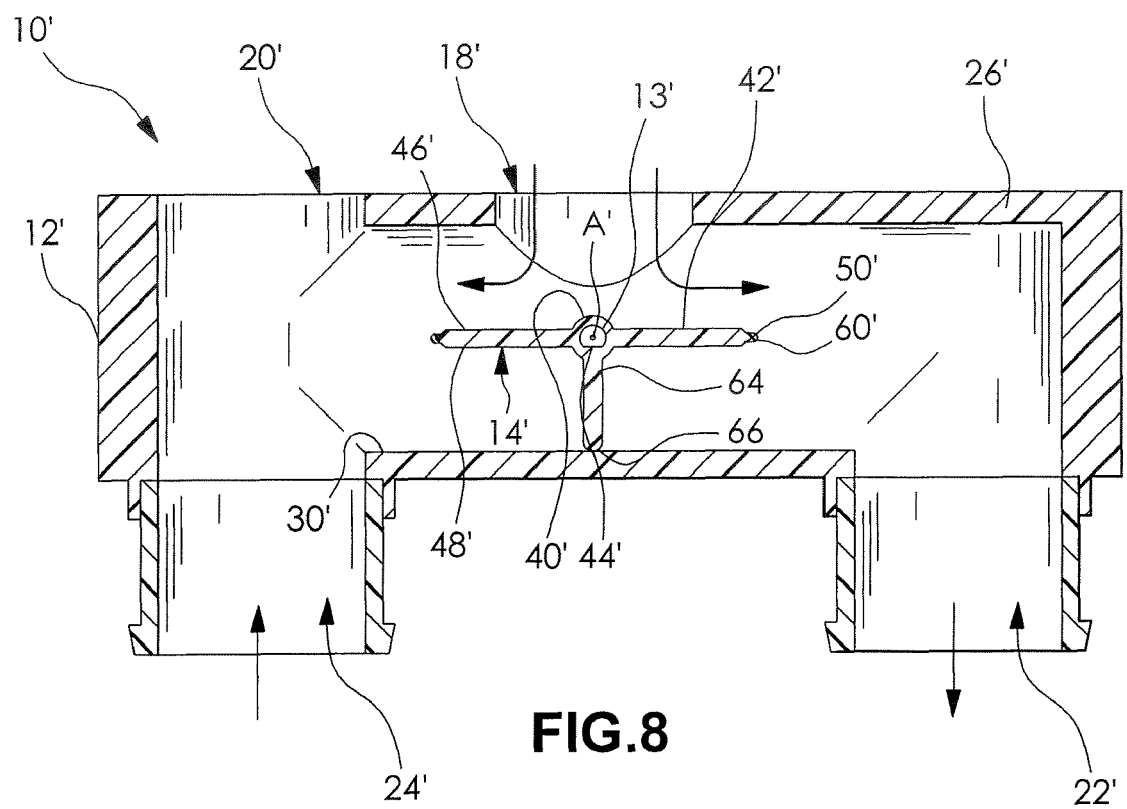
FIG. 8 is a side cross-sectional view of the three-way diverter assembly illustrated in FIG. 6, wherein the three-way diverter assembly is in a third mode of operation.
Figure 9:
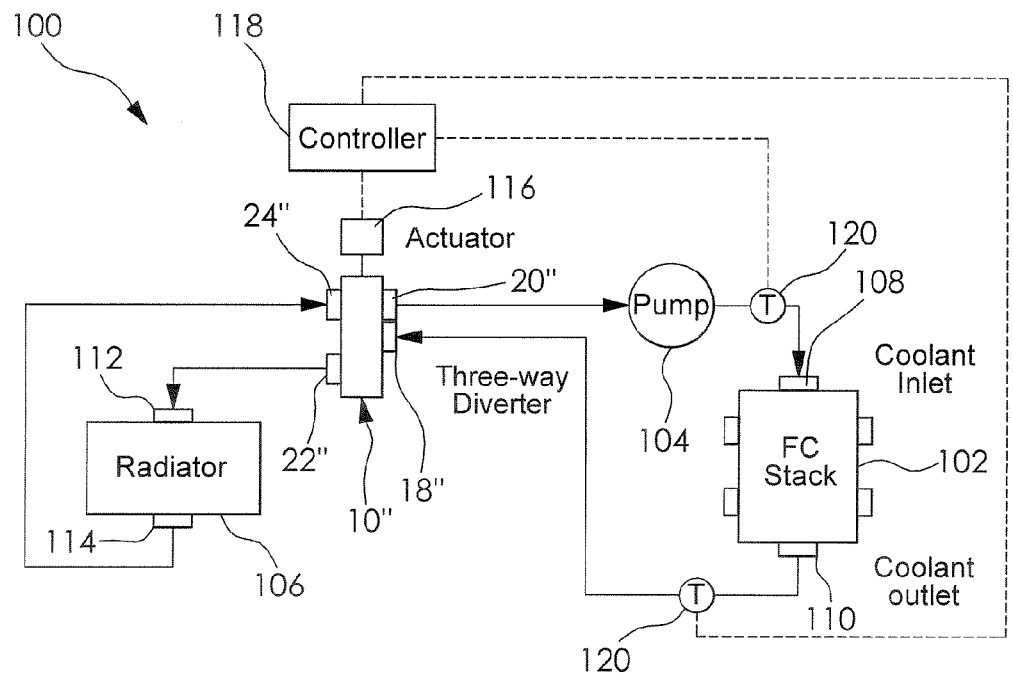
Figure 10:
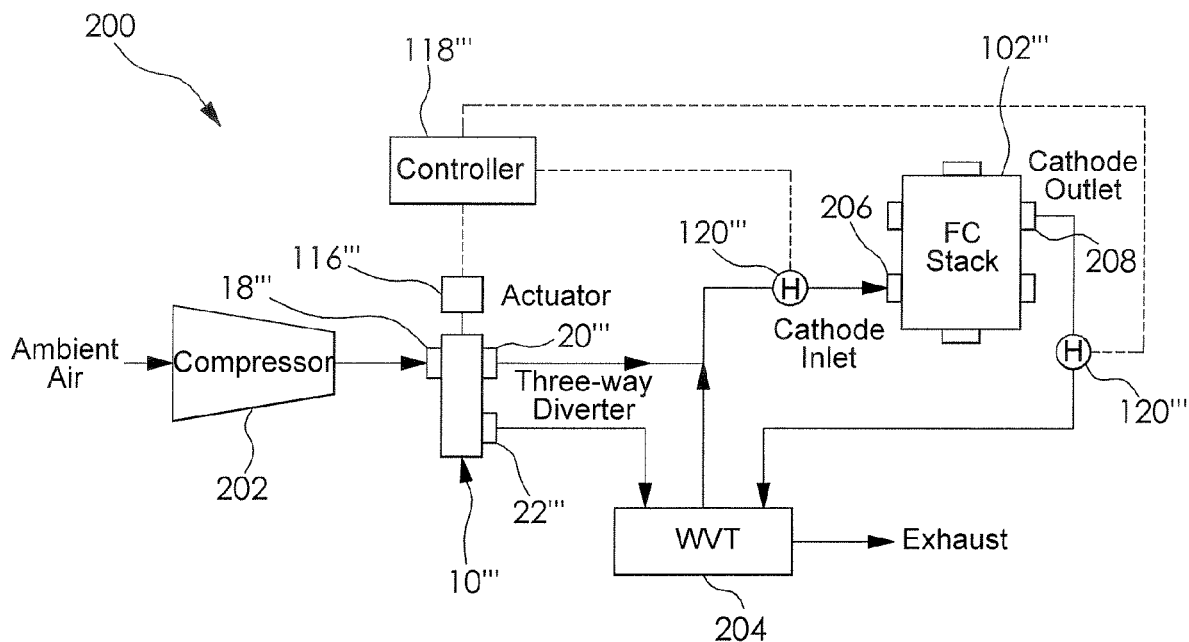

FIG. 9 is a schematic diagram of a fuel cell system having the three-way diverter assembly illustrated in FIGS. 1 to 8, wherein the three-way diverter assembly is adapted to regulate a temperature of a fuel cell stack; and FIG. 10 is a schematic diagram of a fuel cell system having the three-way diverter assembly illustrated in FIGS. 1 to 8, wherein the three-way diverter assembly is adapted to regulate a humidity of a fuel cell stack.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
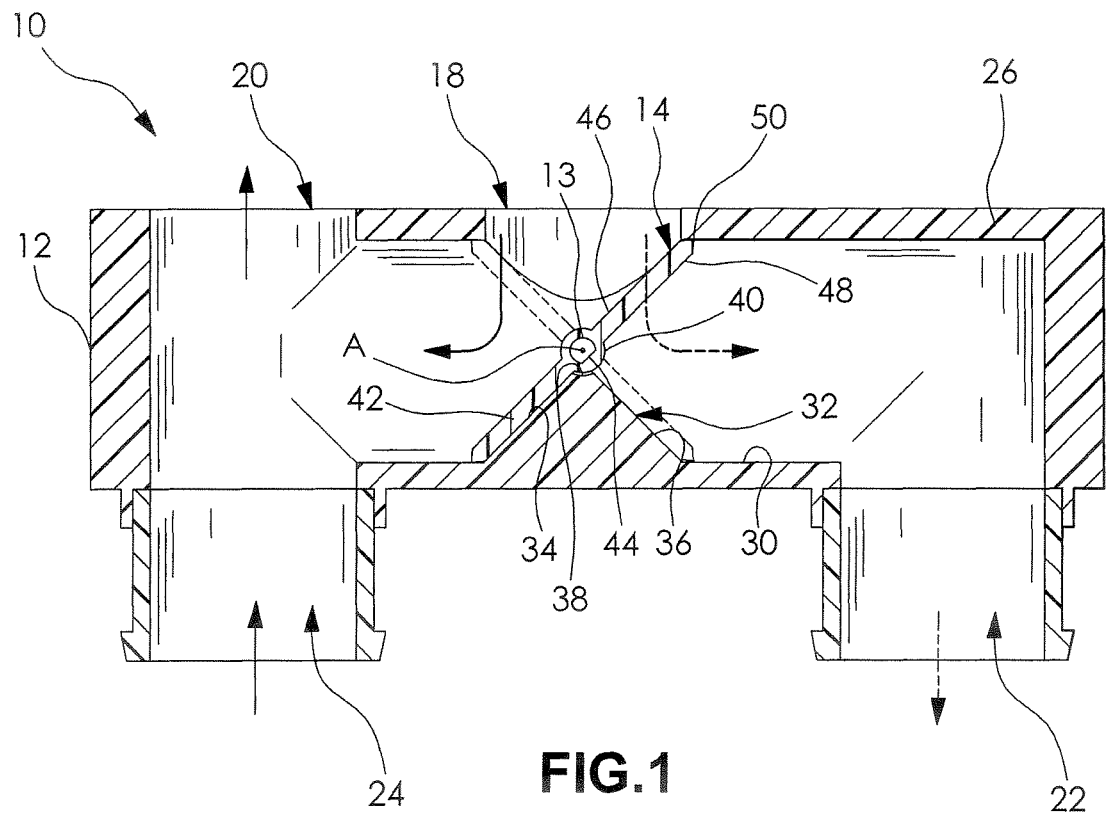
FIG. 1 is a side cross-sectional view of a three-way diverter assembly according to an embodiment of the invention, and showing a first mode and a second mode of operation thereof.
Figure 2:
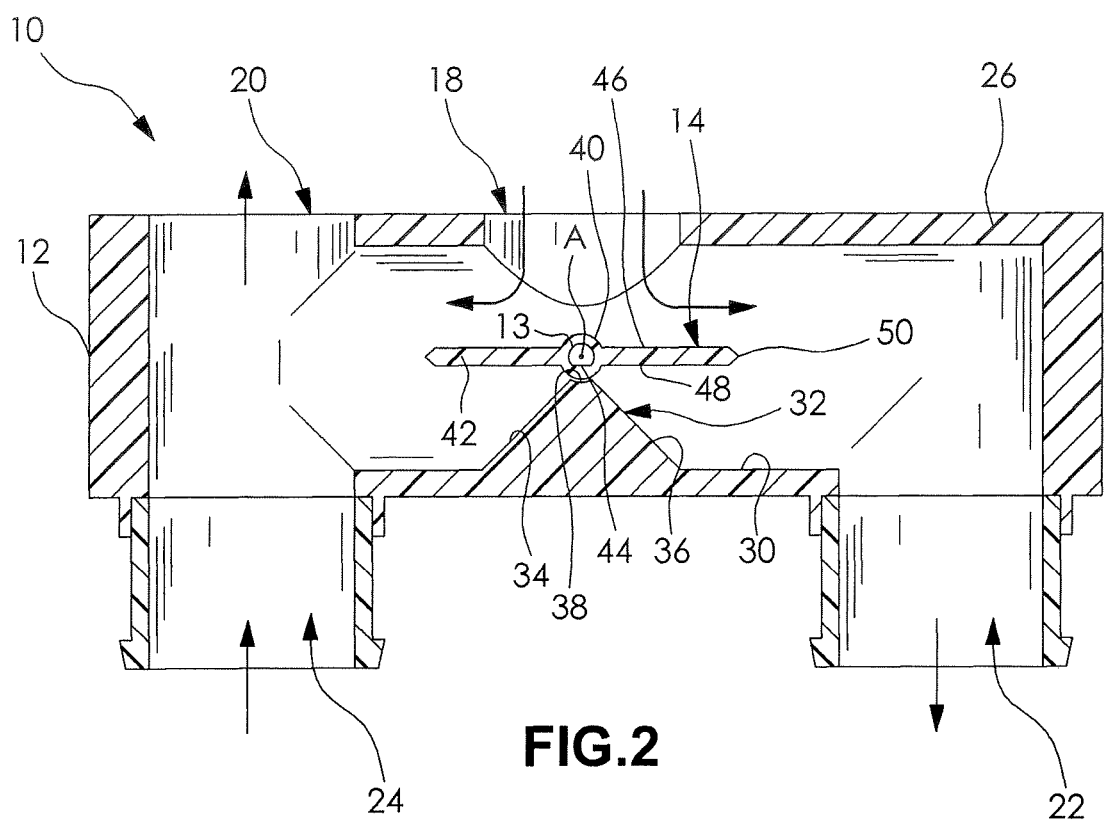
FIG. 2 is a side cross-sectional view of the three-way diverter assembly illustrated in FIG. 1, wherein the three-way diverter assembly is in a third mode of operation.

FIGS. 1, 2, and 3 depict a three-way diverter assembly 10 according to an embodiment of the present invention. In the embodiment shown, the three-way diverter assembly 10 includes a housing 12, a pivot shaft 13, and a movable member 14. As illustrated, the housing 12 is a discrete component having the movable member 14 disposed therein. However, it is understood that the housing 12 can be integrally formed as part of another component such as a part of an end unit of a fuel cell stack of a fuel cell system, for example. Although the housing 12 and the movable member 14 shown are formed from a polymer material, it is understood that the housing 12 and the movable member 14 can be formed from other conventional materials such as a metal material, a composite material, and any combination thereof, for example.

The housing 12 includes a first inlet 18, a first outlet 20, and a second outlet 22. As shown, the housing 12 also includes a second inlet 24. The first inlet 18 and the second inlet 24 are adapted to receive a flow of fluid from at least one fluid source. Although the first inlet 18 and the first outlet 20 are formed in a wall 26 of the housing 12, and the second inlet 24 and the second outlet 22 are formed in the wall 26 of the housing 12 opposite the first inlet 18 and the first outlet 20, it is understood that other configurations and locations of the first inlet 18, the first outlet 20, the second outlet 22, and optionally, the second inlet 24 may be selected as desired.

An interior of the housing 12, within which the movable member 14 rotates, may be a substantially cylindrical bore, for example. Other suitable interior dimensions and shapes for the housing 12 may also be employed. An inner surface 30 of the wall 26 includes a flow restrictor 32 formed thereon. As shown in FIGS. 1 and 2, the flow restrictor 32 has a generally triangular cross-sectional shape and includes a first surface 34, a second surface 36, and a third surface 38. The first surface 34 and the second surface 36 extend upwardly and inwardly from the inner surface 30 of the wall 26 at an angle of about forty-five degrees (45°) to converge at the third surface 38. The third surface 38 has a generally concave shape and is adapted to pivotally receive the movable member 14 therein. Alternatively, the flow restrictor 32 can have a generally linear shape as shown in FIG. 3, wherein the first surface 34 and the second surface 36 extend upwardly and laterally from the inner surface 30 of the wall 26 at an angle of about ninety degrees (90°) in respect of the third surface 38.

As illustrated in FIGS. 1, 2, and 3, the pivot shaft 13 is coupled to the movable member 14 extending through the housing 12 substantially along an axis A. It is understood that the pivot shaft 13 can be integrally formed with the movable member 14 if desired. The pivot shaft 13 rotates the movable member 14 about the axis A when a torque is applied thereto. In the embodiment shown, the movable member 14 is a butterfly-type flapper valve, although it is understood that other valve types can be employed as desired. The movable member 14 is selectively rotatable about the axis A from a first positional limit shown in FIGS. 1 and 3 to a second positional limit indicated by dashed lines in FIGS. 1 and 3. The movable member 14 is also selectively positionable between the first positional limit and the second positional limit, such as a substantially intermediate position of the movable member 14 shown in FIG. 2, for example. The first positional limit of the movable member 14 is in a range from about a forty-five degree (45°) rotation about the axis A to about a one hundred thirty-five degree (135°) rotation about the axis A to the second positional limit. As illustrated in FIGS. 1 and 3, the first positional limit of the movable member 14 is about a ninety degree (90°) rotation about the axis A to the second positional limit. It should be understood that a location of the first and second positional limits may be selected as desired. The movable member 14 selectively causes the fluid to flow to at least one of the first outlet 20 and the second outlet 22 as desired.

The movable member 14 has a generally disk shape. It is understood that the movable member 14 can have any shape as desired. The movable member 14 includes a hollow stem 40 for receiving the pivot shaft 13 and a flange 42 extending laterally outwardly therefrom. An inner wall of the stem 40 may include a substantially flat portion 44 configured to cooperate with a substantially flat surface of the pivot shaft 13 and militate against a rotation of the movable member 14 about the pivot shaft 13. It is understood that the pivot shaft 13 may be fixedly bonded to the movable member 14 such as by an adhesive, for example, if desired. Other suitable means for militating against a rotation of the movable member 14 about the pivot shaft 13 such as a cooperation of a polygonal pivot shaft 13 with a matching polygonal stem 40 may be employed.

The flange 42 is substantially planar and includes a first surface 46 and a second surface 48. The first surface 46 is adjacent the first inlet 18. The second surface 48 is disposed opposite the first surface 46 and the first inlet 18. In the embodiment shown in FIGS. 1 and 2, the second surface 48 is adapted to abut the first surface 34 of the restrictor 32 when the movable member 14 is at the first positional limit, and the second surface 36 of the restrictor 32 when the movable member 14 is at the second positional limit. A sealing surface 50 is formed on a peripheral edge of the movable member 14.

At the first positional limit of the movable member 14, the first sealing surface 50 abuts the inner surface 30 of the wall 26 to form a substantially fluid-tight seal therebetween. The seal militates against the flow of fluid from the first inlet 18 to the second outlet 22 and enables a substantially linear control of the flow of fluid through the three-way diverter assembly 10. At the second positional limit of the movable member 14 indicated by the dashed lines, the sealing surface 50 abuts the inner surface 30 of the wall 26 to form a substantially fluid-tight seal therebetween. The seal militates against the flow of fluid from the first inlet 18 to the first outlet 20 and enables a substantially linear control of the flow of fluid through the three-way diverter assembly 10.

As illustrated in FIG. 2, when the movable member 14 is not at the positional limits, the movable member 14 permits the flow of fluid from the first inlet 18 to both the first outlet 20 and the second outlet 22. The restrictor 32 shown in FIGS. 1, 2 and 3 militates against nonlinearity in flow control, for example, by minimizing backflow across the second surface 48 and the inner surface 30 as the movable member 14 is rotated between the first positional limit and the second positional limit. It should be appreciated that, under conventional flow rates of a coolant fluid, for example, in a fuel cell system, the movable member 14 at each of the first positional limit and the second positional limit provides less than about 200 cc/minute in fluid leakage, particularly less than about 100 cc/minute, and most particularly less than about 50 cc/minute of fluid leakage during operation of the three-way diverter assembly 10. Other suitable leakage tolerances may be selected as desired.

Referring to FIGS. 4 and 5, the movable member 14 may also include at least one buttress-like support 58 formed thereon and an elastomeric seal 60 disposed thereon. The at least one support 58 extends from the flange 42 to the stem 40 to strengthen the movable member 14 and militate against a flexing thereof. As illustrated, the elastomeric seal 60 is disposed on the peripheral edge of the movable member 14 to facilitate a substantially fluid-tight seal between the movable member 14 and the inner surface 30 of the wall 26 of the housing 12. The elastomeric seal 60 may also facilitate a substantially fluid-tight seal between the movable member 14 and the pivot shaft 13. The substantially fluid-tight seals facilitated by the elastomeric seal 60 militate against a leakage of the fluid between at least one of the movable member 14 and the inner surface 30, and the movable member 14 and the pivot shaft 13. In a non-limiting example, the elastomeric seal 60 is a rubber over-molding. A skilled artisan should appreciate that other suitable elastomeric seals 60 may also be employed.

FIGS. 6, 7, and 8 depict another embodiment of the invention which includes a three-way diverter assembly similar to that shown in FIGS. 1 to 5. Reference numerals for similar structure in respect of the description of FIGS. 1 to 5 are repeated in FIGS. 6, 7, and 8 with a prime (') symbol.

The three-way diverter assembly 10' includes a housing 12', a pivot shaft 13', and a movable member 14'. As illustrated, the housing 12' is a discrete component having the movable member 14' disposed therein. However, it is understood that the housing 12' can be integrally formed as part of another component such as a part of an end unit of a fuel cell stack of a fuel cell system, for example. Although the housing 12' and the movable member 14' shown are formed from a polymer material, it is understood that the housing 12' and the movable member 14' can be formed from other conventional materials such as a metal material, a composite material, and any combination thereof, for example.

The housing 12' includes a first inlet 18', a first outlet 20', and a second outlet 22'. As shown, the housing 12' also includes a second inlet 24'. The first inlet 18' and the second inlet 24' are adapted to receive a flow of fluid from at least one fluid source. Although the first inlet 18' and the first outlet 20' are formed in a wall 26' of the housing 12', and the second inlet 24' and the second outlet 22' are formed in the wall 26' of the housing 12' opposite the first inlet 18' and the first outlet 20', it is understood that other configurations and locations of the first inlet 18', the first outlet 20', the second outlet 22', and optionally, the second inlet 24' may be selected as desired. An interior of the housing 12', within which the movable member 14' rotates, may be a substantially cylindrical bore, for example. Other suitable interior dimensions and shapes for the housing 12' may also be employed.

As illustrated, the pivot shaft 13' is coupled to the movable member 14' extending through the housing 12' substantially along an axis A'. It is understood that the pivot shaft 13' can be integrally formed with the movable member 14' if desired. The pivot shaft 13' rotates the movable member 14' about the axis A' when a torque is applied thereto. In the embodiment shown, the movable member 14' is a butterfly-type flapper valve, although it is understood that other valve types can be employed as desired. The movable member 14' is selectively rotatable about the axis A' from a first positional limit shown in FIG. 6 to a second positional limit indicated by dashed lines in FIG. 6. The movable member 14' is also selectively positionable between the first positional limit and the second positional limit, such as a substantially intermediate position of the movable member 14' shown in FIG. 8, for example. The first positional limit of the movable member 14' is in a range from about a forty-five degree (45°) rotation about the axis A' to about a one hundred thirty-five degree (135°) rotation about the axis A' to the second positional limit. The first positional limit of the movable member 14' is about a ninety degree (90°) rotation about the axis A' to the second positional limit. It should be understood that a location of the first and second positional limits may be selected as desired. The movable member 14' selectively causes the fluid to flow to at least one of the first outlet 20' and the second outlet 22' as desired.

The movable member 14' has a generally disk shape. It is understood that the movable member 14' can have any shape as desired. The movable member 14' includes a hollow stem 40' for receiving the pivot shaft 13', a first flange 42' extending laterally outwardly therefrom, and a restrictor formed thereon such as a second flange 64 extending laterally outwardly therefrom. An inner wall of the stem 40' may include a substantially flat portion 44' configured to cooperate with a substantially flat surface of the pivot shaft 13' and militate against a rotation of the movable member 14' about the pivot shaft 13'. It is understood that the pivot shaft 13' may be fixedly bonded to the movable member 14' such as by an adhesive, for example, if desired. Other suitable means for militating against a rotation of the movable member 14' about the pivot shaft 13' such as a cooperation of a polygonal pivot shaft 13' with a matching polygonal stem 40' may be employed.

The first flange 42' is substantially planar and includes a first surface 46' and a second surface 48'. The first surface 46' is adjacent the first inlet 18'. The second surface 48' is disposed opposite the first surface 46' and the first inlet 18'. A sealing surface 50' shown in FIG. 7 is formed on a peripheral edge of the movable member 14'. The second flange 64 includes a sealing surface 66. A clearance between the sealing surface 66 and the inner surface 30' is from about 0.01 mm to about 0.5 mm, particularly from about 0.05 mm to about 0.4 mm, and more particularly from about 0.1 mm to about 0.3 mm, for example. Other suitable clearances may also be employed.

At the first positional limit of the movable member 14', the sealing surface 50' abuts the inner surface 30' of the wall 26' to form a substantially fluid-tight seal therebetween. The seal militates against the flow of fluid from the first inlet 18' to the second outlet 22' and enables a substantially linear control of the flow of fluid through the three-way diverter assembly 10'. At the second positional limit of the movable member 14' indicated by the dashed lines, the sealing surface 50' abuts the inner surface 30' of the wall 26' to form a substantially fluid-tight seal therebetween. The seal militates against the flow of fluid from the first inlet 18' to the first outlet 20' and enables a substantially linear control of the flow of fluid through the three-way diverter assembly 10'.

As illustrated in FIG. 8 when the movable member 14' is not at the positional limits, the movable member 14' permits the flow of fluid from the first inlet 18' to both the first outlet 20' and the second outlet 22'. The sealing surface 66 of the second flange 64 abuts the inner surface 30' of the wall 26' to form a substantially fluid-tight seal therebetween. The second flange 64 militates against nonlinearity in flow control, for example, by minimizing backflow across the second surface 48' and the inner surface 30' as the movable member 14' is rotated between the first positional limit and the second positional limit. It should be appreciated that, under conventional flow rates of a coolant fluid, for example, in a fuel cell system, the movable member 14' at each of the first positional limit and the second positional limit provides less than about 200 cc/minute in fluid leakage, particularly less than about 100 cc/minute, and most particularly less than about 50 cc/minute of fluid leakage during operation of the three-way diverter assembly 10'. Other suitable leakage tolerances may be selected as desired.

The movable member 14' may also include at least one buttress-like support (not shown) formed thereon and an elastomeric seal 60' disposed thereon. The at least one support extends from the flange 42' to the stem 40' to strengthen the movable member 14' and militate against a flexing thereof. As illustrated, the elastomeric seal 60' is disposed on the peripheral edge of the movable member 14' to facilitate a substantially fluid-tight seal between the movable member 14' and the inner surface 30' of the wall 26' of the housing 12'. The elastomeric seal 60' may also facilitate a substantially fluid-tight seal between the movable member 14' and the pivot shaft 13'. The substantially fluid-tight seals facilitated by the elastomeric seal 60' militate against a leakage of the fluid between at least one of the movable member 14' and the inner surface 30', and the movable member 14' and the pivot shaft 13'. It is understood that the elastomeric seal 60' may also be disposed on an outer edge of the second flange 64 to facilitate a substantially fluid-tight seal between the second flange 64 and the inner surface 30' of the wall 26' of the housing 12'. In a non-limiting example, the elastomeric seal 60' is a rubber over-molding. A skilled artisan should appreciate that other suitable elastomeric seals 60' may also be employed.

As shown in FIG. 9, the present invention further includes a first fuel cell system 100 having the three-way diverter assembly disposed therein. Reference numerals for similar structure in respect of the description of FIGS. 1 to 8 are repeated in FIG. 9 with a prime (") symbol.

The first fuel cell system 100 includes a fuel cell stack 102, a fluid pump 104, and a radiator 106. The fuel cell stack 102 includes a plurality of fuel cells and has a coolant inlet 108 and a coolant outlet 110 for circulating a coolant fluid, such as water, therethrough for purpose of regulating a temperature of the fuel cell stack 102. An exemplary fuel cell stack 100 is described in applicant's copending U.S. application Ser. No. 11/874,317, incorporated herein by reference in its entirety.

The fluid pump 104 is in fluid communication with the fuel cell stack 102 and adapted to provide a flow of the coolant fluid thereto. For example, the fluid pump 104 may be part of a coolant system having, for example, a coolant tank (not shown) for containing the coolant fluid circulating through the coolant system to and from the fuel cell stack 102. The pump 104 is in fluid communication with the radiator 106. The radiator 106 has a radiator inlet 112 and a radiator outlet 114. The radiator 106 is also in fluid communication with the fuel cell stack 102 and is adapted to exhaust excess heat from the coolant fluid flowing through the fuel cell stack 102 to the ambient atmosphere.

In a particularly illustrative embodiment, the three-way diverter assembly 10" is disposed between the fuel cell stack 102 and the radiator 106 and is adapted to thermostatically regulate the fuel cell stack 102. The first inlet 18" of the three-way diverter assembly 10" is in fluid communication with the coolant outlet 110 of the fuel cell stack 102. The second inlet 24" of the three-way diverter assembly 10" is in fluid communication with the radiator outlet 114. The first outlet 20" of the three-way diverter assembly 10" is in fluid communication with the coolant inlet 108 of the fuel cell stack 102. The second outlet 22" of the three-way diverter assembly 10" is in fluid communication with the radiator inlet 112.

The first fuel cell system 100 may further include an actuator 116. The actuator 116 is coupled to the movable member 14" of the three-way diverter assembly 10". The actuator 116 is adapted to rotate the movable member 14" about the axis A" as desired. The actuator 116 may include an electric stepmotor, for example, configured to selectively and precisely rotate the movable member 14" to any desired position from the first positional limit to the second positional limit. In another embodiment, the actuator 116 is formed integrally with the three-way diverter assembly 10". Other suitable actuators 116 may also be employed.

The first fuel cell system 100 may also include a controller 118. The controller 118 is in electrical communication with the three-way diverter assembly 10". The controller 118 selectively commands the position of the movable member 14" within the three-way diverter assembly 10" to thermostatically regulate the fuel cell stack 102. In a particular embodiment, the controller 118 is in electrical communication with the actuator 116 and selectively controls the actuator 116 to rotate the movable member 14" to the desired position.

It should be understood that the fuel cell system 100 may include at least one sensor 120 in electrical communication with the controller 118. The sensor 120 provides feedback on a condition of the fuel cell stack 102 that the controller 118 receives and processes for purpose of controlling the three-way diverter assembly 10". The feedback on the condition of the fuel cell stack 102 may be continuously monitored to command the three-way diverter assembly 10" in response to the "real time" condition. As a nonlimiting example, the sensor 120 may be a temperature sensor. The temperature sensor may monitor the temperature of the coolant fluid at at least one of prior to the coolant fluid entering the fuel cell stack 102, at the fuel cell stack 102, and after the coolant fluid exits the fuel cell stack 102, for example. Other suitable locations within the first fuel cell system 100 for monitoring the temperature with the sensor 120 may also be used.

The at least one sensor 120 may also provide feedback relevant to transient conditions of an electric vehicle (not shown) having the first fuel cell system 100. As a nonlimiting example, the at least one sensor 120 may respond to an "open throttle" condition of the electric vehicle. The at least one sensor 120 may provide the feedback of the vehicle condition to the controller 118. The controller 118 may anticipate a change in temperature of the fuel cell stack 102 in relation to the vehicle condition, for example, by employing a suitable algorithm or mathematical relationship. The controller 118 controls the three-way diverter assembly 10" to thermostatically regulate the fuel cell stack 102 and maintain the temperature of the fuel cell stack 102 within the desired range in advance of the anticipated change in temperature.

In operation, the three-way diverter assembly 10" selectively causes a) the coolant fluid to bypass the radiator 106, b) the coolant fluid to flow to the radiator 106, and c) a combination of a) and b) to thermostatically regulate the fuel cell stack 102. For example, during a start-up operation of the fuel cell stack 102, the three-way diverter assembly 10" may cause the coolant fluid to heat the fuel cell stack 102 by militating against an exhausting of heat from the coolant fluid via the radiator 106 and recirculating the coolant fluid to the fuel cell stack 102. The coolant fluid may be caused to bypass the radiator by rotating the movable member 14" to the first position limit shown in FIGS. 1, 3, and 6. The movable member 14" rotated to the first positional limit may form a substantially fluid-tight seal with the housing 12" that causes the coolant fluid to flow from the first outlet 18" through the three-way diverter assembly 10', out of the first outlet 20", bypassing the radiator 106, and to the fuel cell stack 102. The three-way diverter assembly 10" operated in this manner is in a "bypass radiator mode". As the electrochemical reaction within the fuel cell stack 102 is exothermic, the coolant fluid progressively increases in temperature as the coolant fluid circulates through the fuel cell stack 102. The coolant fluid is recirculated through the fuel cell stack 102 until the temperature of the fuel cell stack 102 is within a desired temperature range.

During a further operation of the three-way diverter assembly 10", the three-way diverter assembly 10" militates against an overheating of the fuel cell stack 102. The three-way diverter assembly 10" may cause the coolant fluid to flow to the radiator 106 where any excess heat is exhausted from the first fuel cell system 100. For example, the movable member 14" may be rotated to the second positional limit shown by the dashed lines in FIGS. 1, 3, and 6. The movable member 14" rotated to the second positional limit may form a substantially fluid-tight seal with the housing 12" that causes the coolant fluid to flow from the first outlet 18" through the three-way diverter assembly 10', out of the second outlet 22", and to the radiator 106. The three-way diverter assembly 10" operated in this manner is in a "radiator mode".

Upon attainment of a desirable temperature of the fuel cell stack 102, a first portion of the coolant fluid may be caused to flow to the radiator 106. A second portion of the coolant fluid may simultaneously be caused to bypass the radiator 106 and flow to the fuel cell stack 102. The first and second portions of the coolant fluid having different temperatures are combined and circulated to the fuel cell stack 102 to maintain the temperature thereof within a desired range.

A second fuel cell system 200 according to the present invention is shown in FIG. 10. Reference numerals for similar structure in respect of the description of FIGS. 1 to 8 are repeated in FIG. 10 with a prime (''') symbol.

The second fuel cell system 200 employs the three-way diverter assembly 10''' to regulate a relative humidity of the fuel cell stack 102'''. The second fuel cell system 200 includes the three-way diverter assembly 10''' having the first inlet 18''', the first outlet 20''', and the second outlet 22'''. The second fuel cell system 200 further includes the fuel cell stack 102''', an air compressor 202, and a humidifier or water vapor transfer (WVT) device 204 as are known in the art. The fuel cell stack 102''' has a plurality of fuel cells, a cathode inlet 206, and a cathode outlet 208. The air compressor 202 is in fluid communication with the fuel cell stack 102''' and adapted to provide a flow of charged air thereto. The WVT device 204 is in fluid communication with the air compressor 202 and the fuel cell stack 102'''. The WVT device 204 is adapted to selectively humidify the charged air provided to the fuel cell stack 102'''. The WVT device 204 may transfer moisture to the charged air from a cathode exhaust stream exiting the cathode outlet 208, for example. Other suitable means for humidifying the charged air may also be employed.

The three-way diverter assembly 10''' is disposed in communication with the air compressor 202 and each of the fuel cell stack 102''' and the WVT device 204. The first inlet 18''' is in fluid communication with the air compressor 202. The first outlet 20''' is in fluid communication with the fuel cell system 102'''. The second outlet 22''' is in fluid communication with the WVT device 204. The three-way diverter assembly 10''' is adapted to selectively cause a) the charged air to bypass the WVT device 204 and flow to the fuel cell stack 102''', b) the charged air to flow to the WVT device 204, and c) a combination of a) and b) to regulate the humidity of the fuel cell stack 102'''.

In a further embodiment, the second fuel cell system 200 includes the actuator 116''', the controller 118''', and at least one humidity sensor 120'''. The actuator 116''' is coupled to the movable member 14''' of the three-way diverter assembly 10'''. The actuator 116''' selectively rotates the movable member 14''' about the axis A''' from the first positional limit to the second positional limit, and to desired positions therebetween. The controller 118''' is in electrical communication with the actuator 116'''. The controller 118''' selectively controls the position of the movable member 14''' to regulate the humidity of the fuel cell stack 102'''. The at least one humidity sensor 120''' is in electrical communication with the controller and provides a feedback of the charged air relative humidity to the controller 118''' for purpose of controlling the three-way diverter assembly 10'''.

In operation, the three-way diverter assembly 10''' may deliver the charged air from the air compressor 202 to the WVT device 204 when the movable member 14''' is seated at the first positional limit. The three-way diverter assembly 10''' may also bypass the WVT device 204 and deliver the charged air from the air compressor 202 to the fuel cell stack 102''' when the movable member 14''' is seated at the second positional limit. When the movable member 14''' is at a position between the first and second positional limits, the charged air may be humidified to a desirable level and delivered to the fuel cell stack 102'''. The relative humidity of the fuel cell stack 102''' is thereby regulated.

One of ordinary skill in the art should likewise understand that the three-way diverter assembly 10, 10', 10", 10''' described herein may be used in a fuel cell system in place of any three-way valve presently employed and known in the art.

It is surprisingly found that the three-way diverter assembly 10, 10', 10", 10''' having the movable member 14, 14', 14", 14''' does not have the control issues associated with known three-way movable members. In particular, movable member 14, 14', 14", 14''' produces a more linear relationship between flow of fluid and position of the movable member 14, 14', 14", 14''' than with known three-way movable members. The more linear relationship between fluid flow and position of the movable member 14, 14', 14", 14''' may result in part from the restrictor 32 formed on the inner surface 30 of the housing 12 or the second flange 64 formed on the movable member 14, 14', 14", 14'''.

The substantially fluid-tight seal at each of the first and second positional limits is particularly advantageous over known valves under low ambient temperatures when a coolant fluid leakage, for example, may result in an inefficient buildup in temperature of the fuel cell stack 102. The substantially fluid-tight seal at each of the first and second positional limits is also advantageous over known valves under high ambient temperatures when the coolant fluid leakage may result in an undesirable overheating of the fuel cell stack 102.

Moreover, an amount of torque required to actuate the three-way diverter assembly 10, 10', 10", 10''' is substantially the same as with three-way movable members known in the art. When coupled to an actuator 116, 116''' as described hereinabove, the three-way diverter assembly 10, 10', 10", 10''' can perform as at least one of an electric thermostat for the fuel cell stack 102 and as relative humidity regulator for the fuel cell stack 102'''.

The employment of the three-way diverter assembly 10, 10', 10", 10''' described herein allows for a replacement of both a conventional diverter assembly and a conventional electronic thermostat for controlling a temperature of the fuel cell stack 102, 102'''. Accordingly, the three-way diverter assembly 10, 10', 10", 10''' enables a simplification of the fuel cell system 100, 200 and reduces a manufacturing cost thereof.

While certain representative embodiments and details have been shown for purposes of illustrating the invention, it will be apparent to those skilled in the art that various changes may be made without departing from the scope of the disclosure, which is further described in the following appended claims.

What is claimed is:

1. A three-way diverter assembly, comprising:
a housing having an inner surface, the housing including a first inlet, a second inlet, a first outlet, and a second outlet, wherein the first inlet receives a flow of a first fluid therethrough and the second inlet receives a flow of a second fluid therethrough; and
a movable member disposed in the housing adjacent the first inlet, wherein the movable member is selectively positionable between a first positional limit and a second positional limit, the movable member at an intermediate position between the first positional limit and the second positional limit selectively permitting the flow of the first fluid through the first outlet and the second outlet while permitting the flow of the second fluid from the second inlet to the first outlet, and wherein the flow of the second fluid from the second inlet to the second outlet is militated against by a restrictor as the movable member is rotated between the first positional limit and the second positional limit.

2. The three-way diverter assembly according to claim 1, wherein the restrictor is formed on the inner surface of the housing.

3. The three-way diverter assembly according to claim 2, wherein the restrictor has one of a substantially triangular cross-sectional shape and a substantially linear cross-sectional shape.

4. The three-way diverter assembly according to claim 2, wherein the movable member abuts the restrictor at the first positional limit and the second positional limit.

5. The three-way diverter assembly according to claim 1, wherein the restrictor is formed on the movable member.

6. The three-way diverter assembly according to claim 5, wherein the restrictor is a flange formed on the movable member extending laterally outwardly therefrom.

7. The three-way diverter assembly according to claim 1, wherein a sealing surface formed on the movable member abuts the inner surface of the housing at the first positional limit and the second positional limit to form a substantially fluid-tight seal therebetween to militate against the flow of first fluid from the first inlet to at least one of the first outlet and the second outlet.

8. The three-way diverter assembly according to claim 1, wherein the movable member includes an elastomeric seal.

9. The three-way diverter assembly according to claim 1, further including a pivot shaft disposed through the housing and coupled to the movable member, wherein the pivot shaft rotates the movable member about the axis when a torque is applied thereto.

10. The three-way diverter assembly according to claim 9, wherein the movable member includes at least one aperture for receiving the pivot shaft, the at least one aperture having a substantially flat portion configured to receive a substantially flat surface of the pivot shaft and militate against a rotation of the movable member about the pivot shaft.

11. The three-way diverter assembly according to claim 1, wherein the first fluid and the second fluid are the same fluid type.

12. The three-way diverter assembly according to claim 1, wherein the first fluid and the second fluid are one of a coolant fluid and air.

* * * * *